(12) United States Patent
Davis et al.

(10) Patent No.: US 11,223,675 B2
(45) Date of Patent: *Jan. 11, 2022

(54) HASH DATA STRUCTURE BIASING

(71) Applicant: NETFLIX INC., Los Gatos, CA (US)

(72) Inventors: Jeffrey Davis, Sausalito, CA (US);
Andrew Berglund, Palo Alto, CA (US);
David Pfitzner, College Park (AU)

(73) Assignee: NETFLIX, INC., Los Gatos, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 16/831,670

(22) Filed: Mar. 26, 2020

(65) Prior Publication Data

US 2020/0228597 A1    Jul. 16, 2020

Related U.S. Application Data

(63) Continuation of application No. 15/582,474, filed on Apr. 28, 2017, now Pat. No. 10,609,132.

(51) Int. Cl.
| | |
|---|---|
| *G06F 15/16* | (2006.01) |
| *H04L 29/08* | (2006.01) |
| *H04L 12/26* | (2006.01) |
| *G06F 16/13* | (2019.01) |
| *H04L 12/743* | (2013.01) |

(52) U.S. Cl.
CPC ........ *H04L 67/1023* (2013.01); *G06F 16/137* (2019.01); *H04L 43/0882* (2013.01); *H04L 45/7453* (2013.01); *H04L 67/06* (2013.01); *H04L 67/10* (2013.01); *H04L 67/101* (2013.01); *H04L 67/1065* (2013.01)

(58) Field of Classification Search
CPC ............. H04L 67/1014; H04L 67/2842; H04L 61/2528
See application file for complete search history.

(56) References Cited

U.S. PATENT DOCUMENTS

| 10,609,132 B2* | 3/2020 | Davis ................... G06F 16/137 |
| 2010/0332595 A1 | 12/2010 | Fullagar et al. |
| 2013/0305299 A1 | 11/2013 | Bergstrom et al. |
| 2016/0088072 A1 | 3/2016 | Likhtarov et al. |
| 2016/0164964 A1 | 6/2016 | Yeager et al. |

OTHER PUBLICATIONS

Hwang et al., "Adaptive Performance-Aware Distributed Memory Caching", 10th International Conference on Autonomic Computing (ICAC '13), 2013, pp. 33-43.

* cited by examiner

*Primary Examiner* — Yves Dalencourt
(74) *Attorney, Agent, or Firm* — Artegis Law Group, LLP

(57) ABSTRACT

One embodiment of the present invention sets forth a technique for generating one or more hash data structures. The technique includes generating a hash data structure having entries that correspond to a plurality of content servers, and, for each file included in a first plurality of files, allocating the file to one or more content servers included in the plurality of content servers by comparing a hash value associated with the file to one or more entries included in the entries. The technique further includes comparing a network bandwidth utilization of a first content server to a network bandwidth utilization associated with one or more other content servers included in the plurality of content servers to generate a result, and modifying a first number of entries associated with the first content server and included in the entries based on the result to generate a biased hash data structure.

36 Claims, 6 Drawing Sheets

HASH DATA STRUCTURE BIASING

CROSS-REFERENCE TO RELATED APPLICATIONS

This application is a continuation of the U.S. patent application titled, "HASH DATA STRUCTURE BIASING," filed on Apr. 28, 2017 and having Ser. No. 15/582,474. The subject matter of this related application is hereby incorporated herein by reference.

BACKGROUND OF THE INVENTION

Field of the Invention

Embodiments of the present invention relate generally to data allocation on a computer network and, more particularly, to hash data structure biasing.

Description of the Related Art

Many web-based applications provide services, such as streaming audio and/or streaming video, in a distributed manner over the Internet. In general, such applications operate by distributing copies of different content titles, such as audio files or video files, across servers situated at one or more network locations. For example, a given audio title or video title could comprise a collection of different files that may be independently allocated to one or more servers. By distributing content titles (e.g., files that correspond to a particular content title) across multiple servers, the load on those servers can be balanced, thereby reducing the incidence of errors that may occur when the network bandwidth of a particular server reaches full capacity.

In order to determine how different content titles should be distributed across servers, many network systems implement a technique referred to as "consistent hashing," where one or more entries are allocated for each server in a hash data structure (e.g., a hash ring, hash table, etc.). A hash value is then generated for each content title by performing a hashing operation on an identifier associated with the content title. Then, in order to determine which server should be used to replicate a particular content title, the hash value associated with the content title is compared to the hash data structure, and the server having an entry closest to the hash value of the content title is selected.

One drawback to the above approach is that different content titles oftentimes generate different amounts of network traffic, for example, due to the files having different degrees of popularity. Consequently, a particular server may receive a disproportionate amount of network traffic relative to the other servers, causing errors (e.g., due to insufficient network bandwidth) and/or underutilization of one or more servers.

Conventional techniques commonly address such issues by attempting to steer network traffic towards or away from various servers to balance the load across those servers. However, such steering techniques significantly increase the complexity of content delivery and are typically difficult to implement efficiently. Further, steering techniques may still generate errors when network bandwidth capacity is reached on one or more servers, and a control server is still in the process of steering traffic away from those servers.

As the foregoing illustrates, improved techniques for distributing content across a network of distributed servers would be useful.

SUMMARY OF THE INVENTION

One embodiment of the present invention sets forth a method of generating one or more hash data structures. The method includes generating a hash data structure having a plurality of entries that correspond to a plurality of content servers, where a first number of entries included in the plurality of entries corresponds to a first content server included in the plurality of content servers. The method further includes, for each file included in a first plurality of files, allocating the file to one or more content servers included in the plurality of content servers by comparing a hash value associated with the file to one or more entries included in the plurality of entries. The method further includes comparing a network bandwidth utilization of the first content server to a network bandwidth utilization associated with one or more other content servers included in the plurality of content servers to generate a result, and modifying the first number of entries included in the plurality of entries based on the result to generate a biased hash data structure. The method further includes reallocating at least one file included in the first plurality of files to a different content server included in the plurality of content servers based on the biased hash data structure.

Further embodiments provide, among other things, a control server and a non-transitory computer-readable medium configured to implement the method set forth above.

At least one advantage of the disclosed techniques is that variances between the network bandwidth utilization of different content servers can be reduced. Further, by allocating files using multiple hash data structures, more popular files can be more evenly distributed among different content servers based on network bandwidth capacity, while less popular files can be added to content servers in a manner that efficiently utilizes the storage capacity of the each content server. Accordingly, each content server is more likely to have proportionally utilized network bandwidth capacity and storage capacity.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

System Overview

Figure 1:
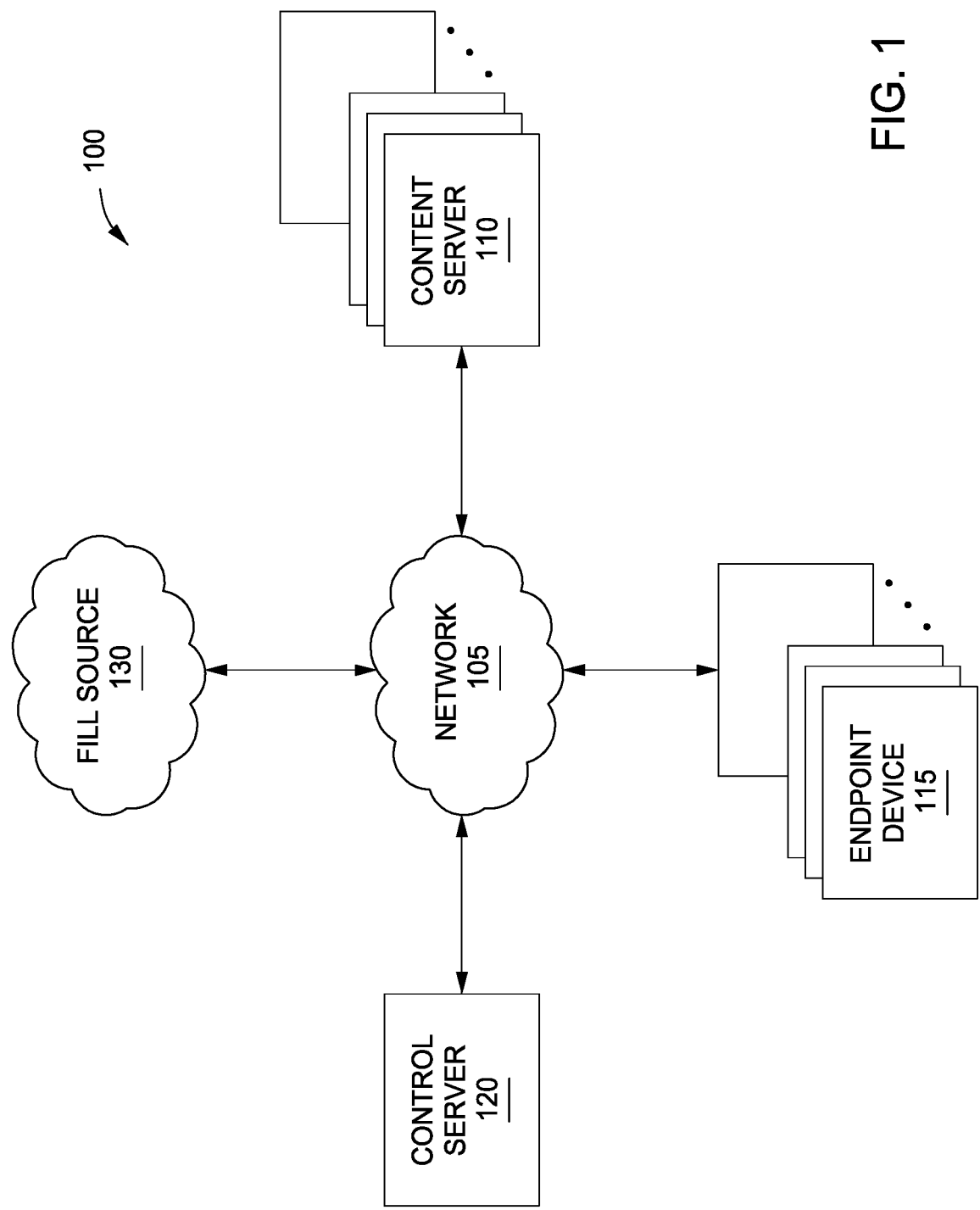
FIG. 1 illustrates a network infrastructure configured to implement one or more aspects of the present invention.

FIG. 1 illustrates a network infrastructure 100 configured to implement one or more aspects of the present invention, according to various embodiments of the invention. As shown, the network infrastructure 100 includes content servers 110, control server 120, and endpoint devices 115, each of which are connected via a communications network 105.

Each endpoint device 115 communicates with one or more content servers 110 (also referred to as "caches" or "nodes") via the network 105 to download content, such as textual data, graphical data, audio data, video data, and other types of data. The downloadable content, also referred to herein as a "file," is then presented to a user of one or more endpoint devices 115. In various embodiments, the endpoint devices 115 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 110 may include a web-server, database, and server application 217 configured to communicate with the control server 120 to determine the location and availability of various files that are tracked and managed by the control server 120. Each content server 110 may further communicate with a fill source 130 and one or more other content servers 110 in order "fill" each content server 110 with copies of various files. In addition, content servers 110 may respond to requests for files received from endpoint devices 115. The files may then be distributed from the content server 110 or via a broader content distribution network. In some embodiments, the content servers 110 enable users to authenticate (e.g., using a username and password) in order to access files stored on the content servers 110. Although only a single control server 120 is shown in FIG. 1, in various embodiments multiple control servers 120 may be implemented to track and manage files.

In various embodiments, the fill source 130 may include an online storage service (e.g., Amazon® Simple Storage Service, Google® Cloud Storage, etc.) in which a catalog of files, including thousands of files, millions of files, etc., is stored and accessed in order to fill the content servers 110. Although only a single fill source 130 is shown in FIG. 1, in various embodiments multiple fill sources 130 may be implemented to service requests for files.

Figure 2:
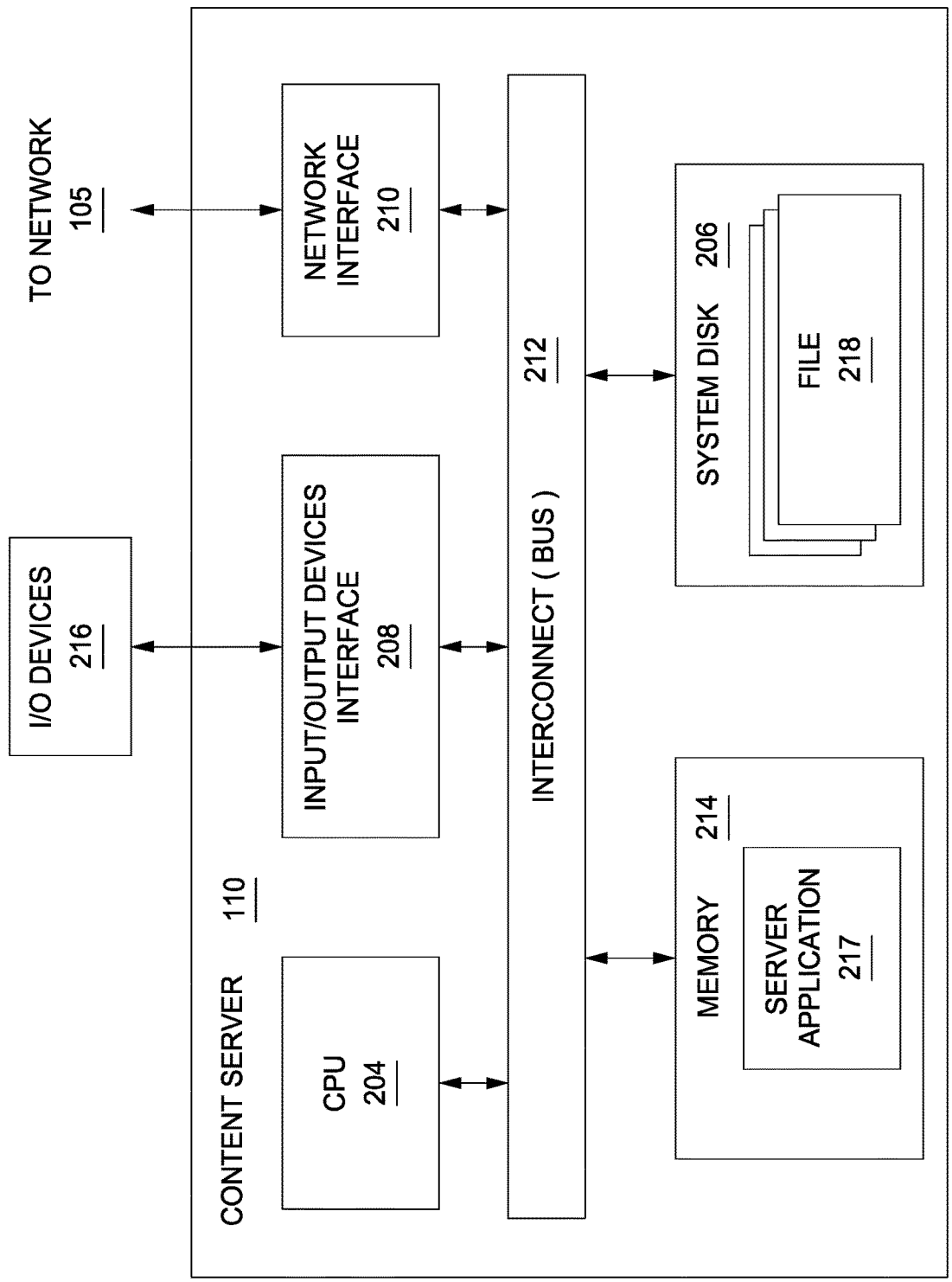
FIG. 2 is a block diagram of a content server that may be implemented in conjunction with the network infrastructure of FIG. 1, according to various embodiments of the present invention.

FIG. 2 is a block diagram of a content server 110 that may be implemented in conjunction with the network infrastructure 100 of FIG. 1, according to various embodiments of the present invention. As shown, the content server 110 includes, without limitation, a central processing unit (CPU) 204, a system disk 206, an input/output (I/O) devices interface 208, a network interface 210, an interconnect 212, and a system memory 214.

The CPU 204 is configured to retrieve and execute programming instructions, such as server application 217, stored in the system memory 214. Similarly, the CPU 204 is configured to store application data and retrieve application data from the system memory 214. The interconnect 212 is configured to facilitate transmission of data, such as programming instructions and application data, between the CPU 204, the system disk 206, I/O devices interface 208, the network interface 210, and the system memory 214. The I/O devices interface 208 is configured to receive input data from I/O devices 216 and transmit the input data to the CPU 204 via the interconnect 212. For example, I/O devices 216 may include one or more buttons, a keyboard, a mouse, and/or other input devices. The I/O devices interface 208 is further configured to receive output data from the CPU 204 via the interconnect 212 and transmit the output data to the I/O devices 216.

The system disk 206 may include one or more hard disk drives, solid state storage devices, or similar storage devices. The system disk 206 is configured to store non-volatile data such as files 218 (e.g., audio files, video files, and/or subtitles) associated with a content catalog. The files 218 can then be retrieved by one or more endpoint devices 115 via the network 105. In some embodiments, the network interface 210 is configured to operate in compliance with the Ethernet standard.

The system memory 214 includes a server application 217 configured to service requests for files 218 received from endpoint device 115 and other content servers 110. When the server application 217 receives a request for a file 218, the server application 217 retrieves the corresponding file 218 from the system disk 206 and transmits the file 218 to an endpoint device 115 or a content server 110 via the network 105. The server application 217 is further configured to request instructions from the control server 120, such as the location(s) from which and/or time(s) at which a particular file can be requested from the fill source 130, a specific content server 110, etc.

Figure 3:
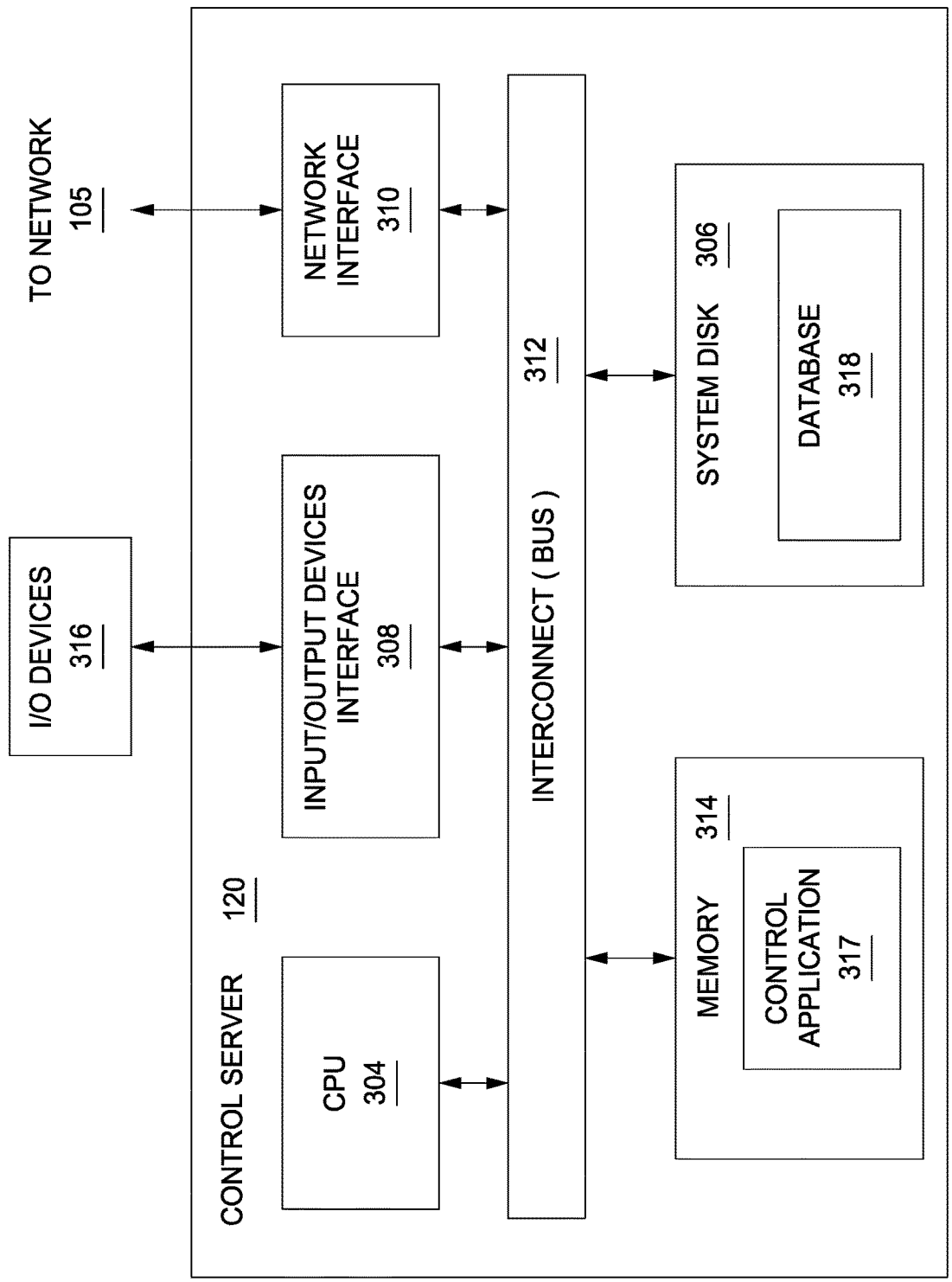
FIG. 3 is a block diagram of a control server that may be implemented in conjunction with the network infrastructure of FIG. 1, according to various embodiments of the present invention.

FIG. 3 is a block diagram of a control server 120 that may be implemented in conjunction with the network infrastructure 100 of FIG. 1, according to various embodiments of the present invention. As shown, the control server 120 includes, without limitation, a central processing unit (CPU) 304, a system disk 306, an input/output (I/O) devices interface 308, a network interface 310, an interconnect 312, and a system memory 314.

The CPU 304 is configured to retrieve and execute programming instructions, such as control application 317, stored in the system memory 314. Similarly, the CPU 304 is configured to store application data and retrieve application data from the system memory 314 and a database 318 stored in the system disk 306. The interconnect 312 is configured to facilitate transmission of data between the CPU 304, the system disk 306, I/O devices interface 308, the network interface 310, and the system memory 314. The I/O devices interface 308 is configured to transmit input data and output data between the I/O devices 316 and the CPU 304 via the interconnect 312. The system disk 306 may include one or more hard disk drives, solid state storage devices, and the like. The system disk 206 is configured to store a database 318 of information associated with the content servers 110, the fill source(s) 130, and the files 218.

The system memory 314 includes a control application 317 configured to access information stored in the database 318 and process the information to determine how files 218 will be distributed across content servers 110 included in the network infrastructure 100. For example, when content servers 110 are to be filled with copies of different files 218, a listing of identifiers (IDs) associated with the content servers 110, referred to as server IDs, are accessed from the database 318. The control application 317 then processes the server IDs in conjunction with file IDs associated with the files 218 to determine the content server(s) 110 to which each file 218 will be distributed.

In order to meet peak traffic demands and redundancy requirements, multiple copies of each file 218 may be replicated across the content servers 110 included in the network infrastructure 100. Accordingly, in various embodiments, a consistent hashing operation may be performed by the control application 317 to distribute files 218 across multiple content servers 110. In some embodiments, the control application 317 generates a hash value for each content server 110 by performing a hashing operation (e.g., applying an MD5 message-digest algorithm) on a server ID associated with the content server 110. The control application 317 then sorts the resulting hash values to form a hash data structure, such as a hash ring, a hash table, etc. In order to determine the content server(s) 110 to which a particular file 218 will be distributed, the control application 317 then generates a hash value for the file 218 by applying the same (or a different) hashing operation to a file ID associated with the file 218.

Next, the control application 317 compares the hash value associated with the file 218 to the hash data structure and selects the content server 110 having a hash value closest to the hash value of the file 218 as a content server 110 on which the file 218 will be stored. Further, if a replication factor (RF)>1 is specified for the file 218, then the control application 317 selects one or more additional content server(s) 110 that are next (e.g., based on hash value) in the hash data structure to store the file 218. In some embodiments, the control application 317 selects the next content servers 110 in the hash data structure by "walking" around a hash ring or down a hash table until a desired number of content servers 110 are selected.

In various embodiments, in order to avoid the "hot neighbor" problem—where content servers 110 located sequentially in the hash data structure receive multiple popular files 218 and, as a result, experience degraded performance—the control application 317 may allocate multiple entries to the hash data structure for a particular content server 110. Consequently, each content server 110 will appear multiple times in the hash data structure, greatly reducing the likelihood that the same subset of content servers 110 will receive multiple popular files 218. For example, the control application 317 could first combine each server ID with a plurality of different values (e.g., a fixed range of 1,000 constants) prior to generating the hash data structure. The control application 317 could then perform the hashing operation on each combination to generate 1,000 hash values for each content server 110. An example is provided below.

In a specific example, assume that the network infrastructure 100 includes 20 content servers. To create the hash data structure (e.g., a hash ring), the control application 317 combines each of the 20 server IDs with a fixed range of constants (e.g., 1 to 1000), applies the hashing operation to each of the combinations, and sorts the 20,000 resulting hash values to generate a hash ring. Further assuming that the content servers 110 are named A through T, the resulting hash ring could include the following hash values:
00000000: D
00003064: A
00005662: S
00007174: N
00009947: A
00012516: T
00015577: Q
00016652: R
00021625: L
00025057: Q
00028665: K
. . .
23451234: F
23453753: R
23456802: Q
23459919: I
23462687: A
23463273: I
23466229: T
23471069: M
23475876: G
23476011: T
(hash ring loops back to beginning)

Given a RF=3, the control application 317 then performs the hashing operation on the file ID associated with the file 218 and selects the first 3 content servers 110 encountered on the hash ring. For example, assuming that performing the hashing operation on the file ID results in a hash value of 00015500, the control application 317 will select Q as the primary content server 110, since 00015577 is the first content server 110 encountered after 00015500, and will select R and L as the replica content servers 110.

As previously described herein, determining how different files 218 should be distributed across content servers 110 presents various challenges. In particular, different files 218 may have different degrees of popularity and, thus, may generate different amounts of traffic. Consequently, even when the techniques described above are implemented by the control application 317, a particular content server 110 may receive a disproportionate amount of traffic relative to other content servers 110, causing overutilization and/or underutilization of one or more content servers 110.

Although various types of steering techniques can be implemented to address overutilization and/or underutilization of content servers 110, such techniques have several drawbacks. In general, steering techniques increase the complexity of content delivery and are often difficult to implement efficiently. Further, steering techniques may still generate errors when network bandwidth capacity is reached on one or more servers, while a control server is in the process of steering traffic away from those servers.

Accordingly, various embodiments implement hash data structure biasing, whereby consistent hashing is first performed to generate an initial hash data structure that indicates how different files 218 will be distributed across content servers 110. The files 218 are then distributed to the content servers 110 according to the hash data structure, and the network bandwidth utilization of each content server 110 is estimated. Next, for each content server 110, the number of entries in the hash data structure is scaled based on the network bandwidth utilization of the content server 110. The files 218 are then reallocated to the content servers 110 according to the updated hash data structure. As a result, a portion of the files 218 may be distributed to one or more different content servers 110, reducing the variance in network bandwidth utilization between the content servers 110.

Further, in various embodiments, two or more hash data structures may be implemented to determine how different files 218 will be distributed across content servers 110. Specifically, the files 218 may be sorted based on one or more criteria, such as file popularity. A different hash data structure may then be generated for each segment of the sorted files 218. For example, a first hash data structure may be generated for files 218 having a high degree of popularity, and a second hash data structure may generated for files 218 having a lower degree of popularity. With respect to the first hash data structure, the number of entries allocated to each content server 110 could be based on (e.g., proportional to) the network bandwidth capacity of the content server 110. With respect to the second hash data structure, the number of entries allocated to each content server 110 could be based on the remaining available storage space of the content server 110.

Additionally, in some embodiments, the hash data structure biasing approach and the multiple hash data structure approach described above may be combined. For example, a first hash data structure and a second hash data structure may be generated based on one or more criteria. Then, for each content server 110, the number of entries in one or both of the first hash data structure and the second hash data structure may be scaled based on the network bandwidth utilization of the content server 110. These approaches are described below in further detail in conjunction with FIGS. 4 and 5.

Hash Data Structure Biasing

In various embodiments, hash data structure biasing is performed by modifying the number of entries (e.g., hash values) allocated to a particular content server 110 in a hash data structure in order to increase or decrease the amount of network traffic being served by the content server 110. For example, if a particular content server 110 has reached its network bandwidth capacity and/or is serving a disproportionately high amount of network traffic relative to other content servers 110, then the number of entries allocated to that content server 110 in the hash data structure may be decreased. As a result, a portion of the files 218 that were previously stored on and served by the overutilized content server 110 will be allocated to other content servers 110, reducing the amount of network traffic being served by the content server 110.

If, on the other hand, a particular content server 110 is being underutilized (e.g., serving a disproportionately low amount of network traffic relative to other content servers 110), then the number of entries allocated to that content server 110 in the hash data structure may be increased. As a result, a portion of the files 218 that were previously stored on and served by one or more other content servers 110 will be allocated to the content server 110, increasing the amount of network traffic being served by the content server 110.

In each example provided above, reallocating one or more files 218 to different content server(s) 110 according to the biased hash data structure enables the variance in network bandwidth utilization between the content servers 110 to be reduced. A variety of techniques can be implemented in order to modify, based on one or more criteria, the number of entries of the hash data structure that are allocated to a particular content server 110. Examples of such techniques are described below in conjunction with FIG. 4.

Figure 4:
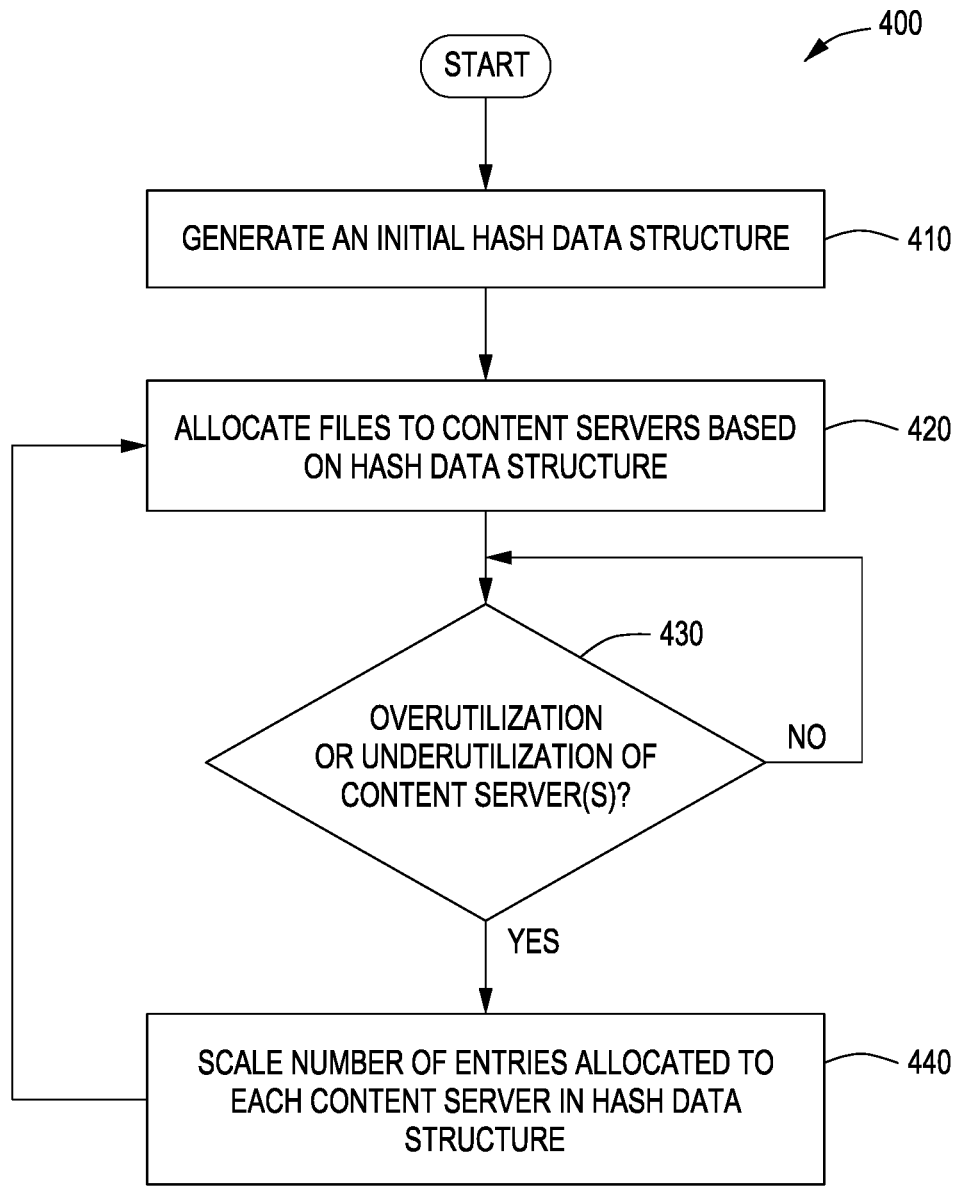
FIG. 4 illustrates a flow diagram of method steps for biasing a hash data structure based on network bandwidth utilization of a content server, according to various embodiments of the present invention.

FIG. 4 illustrates a flow diagram of method steps for biasing a hash data structure based on network bandwidth utilization of a content server 110, according to various embodiments of the present invention. Although the method steps are described in conjunction with the systems of FIGS. 1-3, persons skilled in the art will understand that any system configured to perform the method steps, in any order, falls within the scope of the present invention.

As shown in FIG. 4, a method 400 begins at step 410, where the control application 317 generates an initial hash data structure, such as a hash ring or a hash table, by performing a first hashing operation on the server identifiers (IDs) associated with each of the content servers 110. At step 420, the control application 317 allocates the files 218 to the content servers 110 based on the hash data structure. For example, at step 420, the control application 317 could generate a hash value for each file 218 (e.g., based on a file ID associated with the file 218) and then determine one or more content servers 110 on which the file 218 will be stored by comparing the hash value to the hash data structure.

Next, at step 430, the control application 317 determines whether one or more content servers 110 are overutilized or underutilized, for example, based on the network bandwidth utilization of the content servers 110. If, at step 430, the control application 317 determines that a content server 110 is overutilized or underutilized, then the method 400 proceeds to step 440, where the control application 317 scales the number of entries allocated to the content server 110 in the hash data structure. The method 400 then returns to step 420, where the control application 317 reallocates one or more files 218 to one or more content servers 110 based on the biased hash data structure. The method 400 then proceeds to step 430, where the control application 317 determines whether one or more content servers 110 are overutilized or underutilized. Alternatively, after the control application 317 reallocates one or more files 218 to one or more content servers 110 based on the biased hash data structure, the method 400 may terminate.

In various embodiments, at step 440, the control application 317 may scale the number of entries allocated to a particular content server 110 in the hash data structure by comparing the network bandwidth utilization of the content server 110 to an average network bandwidth utilization of the content servers 110 included in a group of content servers 110 (e.g., a cluster of content servers 110) to which the content server 110 belongs. In some embodiments, Equation 1 may be implemented by the control application 317 to calculate a scaling factor $F_1$ by which the number of entries allocated to a particular content server 110 will be scaled.

$$F_i = \frac{\text{(average network bandwidth utilization of cluster)}}{\text{(network bandwidth utilization of content server)}} \quad \text{(Eq. 1)}$$

If, at step 430, the control application 317 determines that no content server 110 is overutilized or underutilized (e.g., based on a threshold network bandwidth utilization and/or variance), then the control application 317 may continue to monitor the network bandwidth utilization of the content servers 110 to determine whether any of the content servers 110 becomes overutilized or underutilized. Alternatively, at step 430, upon determining that no content server 110 is overutilized or underutilized, the method 400 may terminate.

Multiple Hash Data Structure Approach

In various embodiments, two or more hash data structures may be implemented to distribute files 218 across content servers 110. In some embodiments, content server 110 entries may be allocated to each hash data structure based on one or more criteria, such as the network bandwidth capacity and/or storage capacity of each content server 110. A variety of techniques can be implemented in order to generate two or more hash data structures. Examples of such techniques are described below in conjunction with FIGS. 5, 6A, and 6B.

Figure 5:
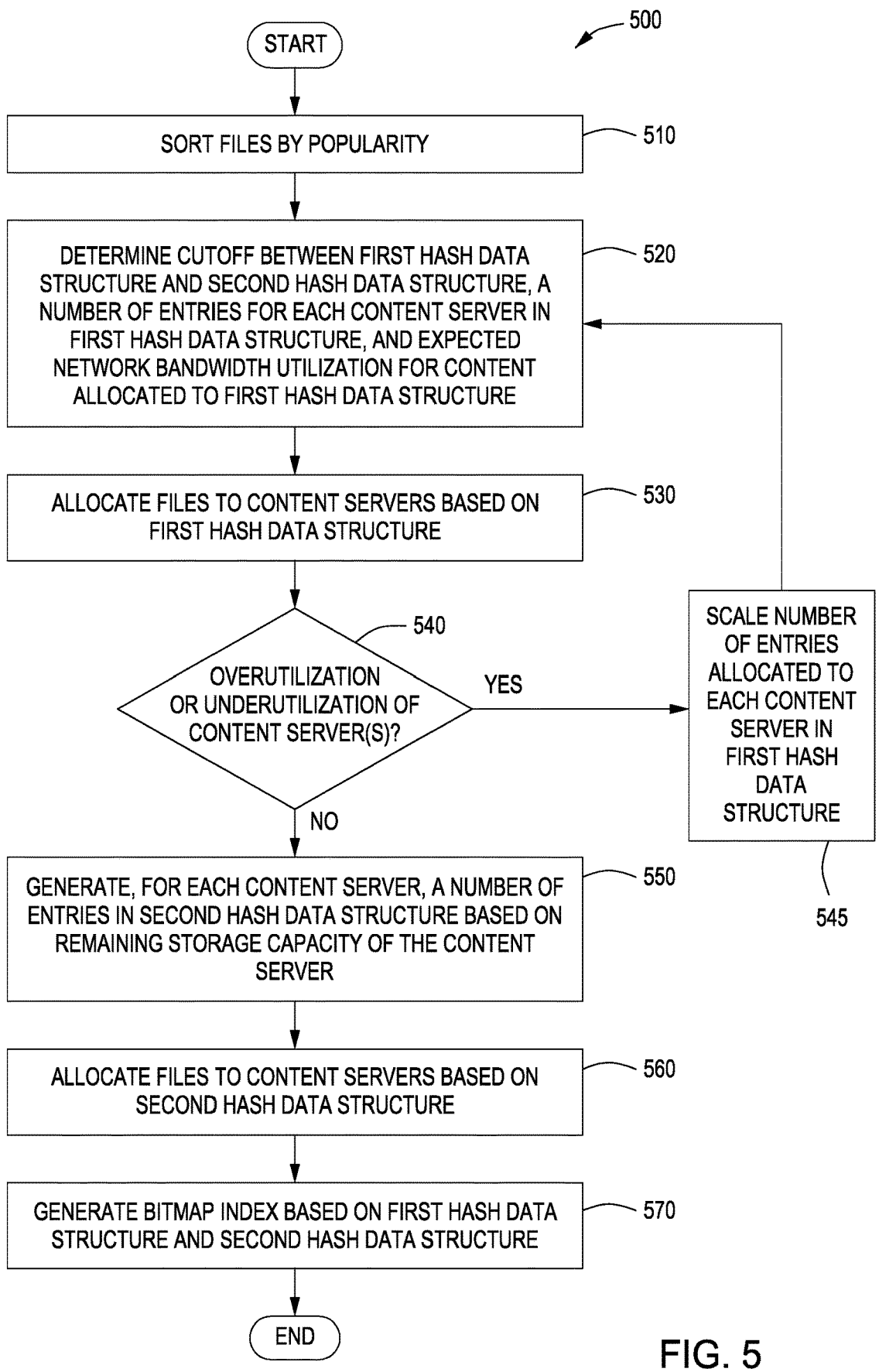
FIG. 5 illustrates a flow diagram of method steps for generating two hash data structures based on the network bandwidth capacity and storage capacity of multiple content servers, according to various embodiments of the present invention.

FIG. 5 illustrates a flow diagram of method steps for generating two hash data structures based on the network bandwidth capacity and storage capacity of multiple content servers 110, according to various embodiments of the present invention. Although the method steps are described in conjunction with the systems of FIGS. 1-3, persons skilled in the art will understand that any system configured to perform the method steps, in any order, falls within the scope of the present invention.

Figure 6A:
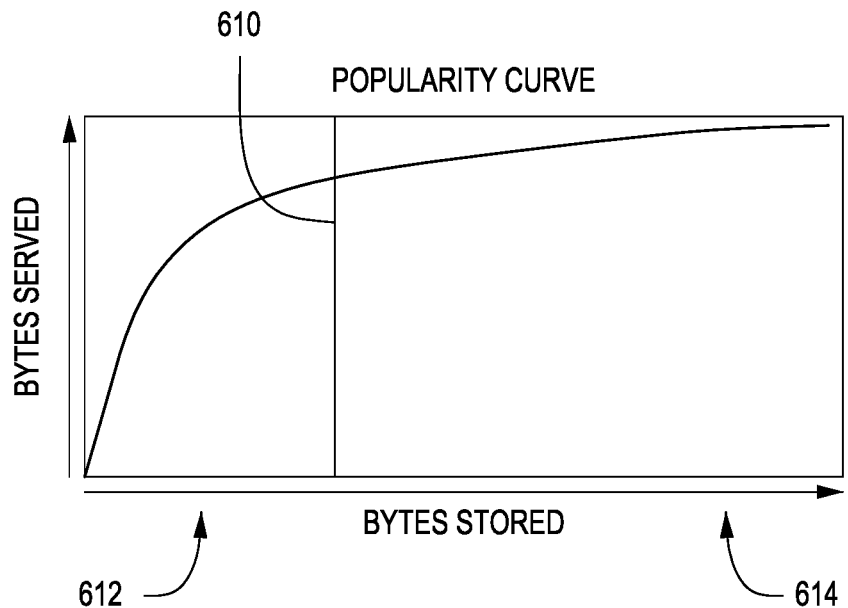
FIGS. 6A and 6B illustrate the number of bytes served by various content servers as a function of the total number of bytes stored by those content servers, according to various embodiments of the present invention.

As shown in FIG. 5, a method 500 begins at step 510, where the control application 317 sorts the files 218 by popularity, for example, based on the amount of network traffic generated by each file 218. In many content distribution networks, a small portion of files 218 (e.g., 15 to 25% of files 218) included in a content catalog are responsible for the majority of network bandwidth usage (e.g., 75 to 85% of network bandwidth usage) generated within a network of content servers 110. An example of this relationship is shown in FIG. 6A, which illustrates the number of bytes served by various content servers 110 as a function of the total number of bytes stored by those content servers 110, where the files 218 have been sorted in order of decreasing popularity.

At step 520, the control application 317 determines a cutoff point 610 in the sorted files 218 and an associated number of entries in both the first hash data structure and the second hash data structure. The cutoff point 610 represents a division between a first segment 612 of files 218 that will be allocated via the first hash data structure and a second segment 614 of files 218 that will be allocated via the second hash data structure. In some embodiments, the control application 317 selects a cutoff point 610 by solving a linear program (LP) having constraints that include a number of content servers 110, a storage capacity and network bandwidth capacity of each content server 110, and/or expected ratios of traffic to be served from files 218 included in the first segment 612 and the second segment 614. The solve step of the LP may be computed by the control application 317 over a range of cutoff points 610. The control application 317 may then select an acceptable cutoff point 610 based on one or more additional criteria, such as a desire for the number of files 218 allocated via the first hash data structure to be roughly equal to the number of files 218 allocated via the second hash data structure. Further, in some embodiments, the cutoff point 610 is chosen by solving the LP so that, based on the popularity of allocated files 218, the network and storage capacity are expected to be fully utilized.

Figure 6B:
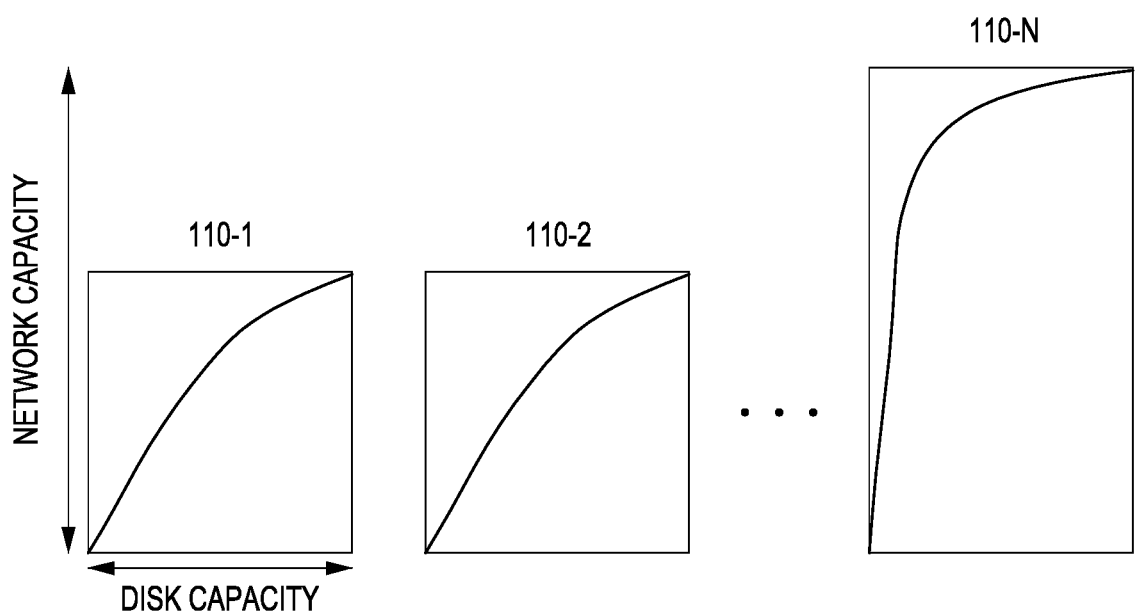

As noted above, at step 520, the control application 317 generates, for each content server 110, a number of entries in the first hash data structure based on the network bandwidth capacity of the content server 110. In some embodiments, the number of entries included in the first hash data structure for a particular content server 110 could be substantially proportional to the network bandwidth capacity of the content server 110. For example, as shown in FIG. 6B, content server 110-N may have a network bandwidth capacity of 100 Gbps and a storage capacity of 10 TB, and content server 110-1 and content server 110-2 may each have a network bandwidth capacity of 50 Gbps and a storage capacity of 10 TB. As a result, content server 110-N may be allocated twice as many entries in the first hash data structure as either content server 110-1 or content server 110-2. However, in various embodiments, because the cutoff point 610 is intended to improve the utilization of both network capacity and storage capacity, the number of entries included in the first hash data structure for a particular content server 110 is not necessarily proportional to the network bandwidth capacity of that content server 110.

Accordingly, by determining the cutoff point 610 as well as the number of entries included in both the first hash data structure and the second hast data structure (e.g., via a LP), the most popular files 218 are likely to be evenly distributed across the content servers 110 based on the network bandwidth capacities of the content servers 110. In some embodiments, the control application 317 may attempt to solve the LP described above such that each of the curves shown in FIG. 6B intersects the upper right corner of the network bandwidth capacity versus storage capacity graph. Under such circumstances, each content server 110 may have substantially proportionally utilized network bandwidth capacity and storage capacity.

Next, at step 530, the control application 317 allocates the first segment 612 of files 218 to the content servers 110 according to the first hash data structure. At step 540, the control application 317 determines whether any of the content servers 110 are underutilized or overutilized (e.g., based on the values calculated at step 520). If, at step 540, the control application 317 determines that a content server 110 is overutilized or underutilized, then the method 500 proceeds to step 545, where the control application 317 scales the number of entries allocated to the content server 110 in the first hash data structure. The method 500 then returns to step 530, where the control application 317 reallocates one or more files 218 to one or more content servers 110 based on the biased first hash data structure.

In some embodiments, the method 500 may then proceed to step 540, where the control application 317 again determines whether one or more content servers 110 are overutilized or underutilized. In such embodiments, steps 530, 540, and 545 may be repeated until the variance in network bandwidth usage between the content servers 110 is below a threshold level. Alternatively, after the control application 317 reallocates one or more files 218 to one or more content servers 110 based on the biased first hash data structure, the method 500 may proceed to step 550.

At step 550, the control application 317 then generates, for each content server 110, a number of entries in the second hash data structure based on the remaining storage capacity of the content server 110. In various embodiments, the number of entries included in the second hash data structure for a particular content server 110 is proportional to the remaining storage capacity of the content server 110. Because of the roughly power law relationship between file popularity and the network traffic generated by a file 218, the files 218 that are allocated via the second hash data structure may not account for significant network bandwidth. Accordingly, content server 110 entries generally can be added to the second hash data structure in proportion to the remaining storage capacity of each content server 110.

At step 560, the control application 317 allocates the second segment 614 of files 218 to the content servers 110 according to the second hash data structure. The control application 317 (or another application executing on a different computing device) may then generate a bitmap based on the first hash data structure and the second hash data structure, where the bitmap indicates the content server(s) 110 on which each file 218 is stored. The method 500 then terminates.

In sum, a control application performs hash data structure biasing by generating an initial hash data structure that indicates how different files will be distributed across content servers. The files are then distributed to the content servers according to the hash data structure, and the network bandwidth utilization of each content server is estimated. Next, for each content server, the number of entries in the hash data structure is scaled based on the network bandwidth utilization of the content server. The files are then reallocated to the content servers according to the updated hash data structure.

Further, the control application may generate two or more hash data structures by sorting the files based on popularity. A first hash data structure may be then generated for files having a high degree of popularity, and a second hash data structure may generated for files having a lower degree of popularity. With respect to the first hash data structure, the number of entries allocated to each content server could be proportional to the network bandwidth capacity of the content server. With respect to the second hash data structure, the number of entries allocated to each content server could be proportional the remaining available storage space of the content server.

As a result, a portion of the files 218 may be distributed to one or more different content servers 110, reducing the variance in network bandwidth utilization between the content servers 110.

At least one advantage of the disclosed techniques is that variances between the network bandwidth utilization of different content servers can be reduced. Further, by allocating files using multiple hash data structures, more popular files can be more evenly distributed among different content servers based on network bandwidth capacity, while less popular files can be added to content servers in a manner that efficiently utilizes the storage capacity of the each content server. Accordingly, each content server is more likely to have proportionally utilized network bandwidth capacity and storage capacity.

1. In some embodiments, a method, comprises generating a hash data structure having a plurality of entries that correspond to a plurality of content servers, wherein a first number of entries included in the plurality of entries corresponds to a first content server included in the plurality of content servers; for each file included in a first plurality of files, allocating the file to one or more content servers included in the plurality of content servers by comparing a hash value associated with the file to one or more entries included in the plurality of entries; comparing a network bandwidth utilization of the first content server to a network bandwidth utilization associated with one or more other content servers included in the plurality of content servers to generate a result; modifying the first number of entries included in the plurality of entries based on the result to generate a biased hash data structure; and reallocating at least one file included in the first plurality of files to a different content server included in the plurality of content servers based on the biased hash data structure.

2. The method of clause 1, further comprising calculating an average network bandwidth utilization of a cluster of content servers to which the first content server belongs, wherein modifying the first number of entries based on the result comprises increasing or decreasing the first number of entries included in the plurality of entries based on a ratio of the average network bandwidth utilization of the cluster of content servers to the network bandwidth utilization of the first content server.

3. The method of any of clauses 1-2, wherein: modifying the first number of entries comprises adding at least one additional entry to the first number of entries, and reallocating the at least one file included in the first plurality of files comprises moving the at least one file from a second content server to the first content server based on the at least one additional entry, or modifying the first number of entries comprises removing at least one entry from the first number of entries, and reallocating the at least one file included in the first plurality of files comprises moving the at least one file from the first content server to a third content server based on the removal of the at least one entry.

4. The method of any of clauses 1-3, wherein generating the hash data structure comprises: sorting the files by popularity to generate a sorted list; dividing the sorted list into two or more segments, wherein a first segment included in the two or more segments includes the first plurality of files, the first plurality of files having a highest degree of popularity relative to other files included in the sorted list; and for each content server included in the plurality of content servers, adding a given number of entries to the hash data structure based on a network bandwidth capacity associated with the content server.

5. The method of any of clauses 1-4, further comprising generating a second hash data structure by adding, for each content server included in the plurality of content servers, a given number of entries to the second hash data structure based on a remaining storage capacity associated with the content server.

6. The method of any of clauses 1-5, wherein the first number of entries included in the plurality of entries is modified prior to when the second hash data structure is generated.

7. The method of any of clauses 1-6, further comprising allocating a second plurality of files included in a second segment of the two or more segments to the plurality of content servers based on the second hash data structure.

8. The method of any of clauses 1-7, wherein each file included in the second plurality of files has a degree of popularity that is lower than a degree of popularity of any file included in the first plurality of files.

9. The method of any of clauses 1-8, further comprising calculating a cutoff point in the sorted list by solving a linear program (LP) based on at least one of a storage capacity of content servers included in the plurality of content servers, a network bandwidth capacity of the content servers included in the plurality of content servers, and an expected network bandwidth utilization associated with each segment included in the two or more segments, wherein the sorted list is divided into two or more segments based on the cutoff point.

10. A control server, comprising: a memory storing a control application; and a processor that is coupled to the memory and, when executing the control application, is configured to: generate a hash data structure having a plurality of entries that correspond to a plurality of content servers, wherein a first number of entries included in the plurality of entries corresponds to a first content server included in the plurality of content servers; for each file included in a first plurality of files, allocate the file to one or more content servers included in the plurality of content servers by comparing a hash value associated with the file to one or more entries included in the plurality of entries; and compare a network bandwidth utilization of the first content server to a network bandwidth utilization associated with one or more other content servers included in the plurality of content servers to generate a result; modifying the first number of entries included in the plurality of entries based on the result to generate a biased hash data structure.

11. The control server of clause 10, wherein the processor, when executing the control application, is further configured to reallocate at least one file included in the first plurality of files to a different content server included in the plurality of content servers based on the biased hash data structure.

12. The control server of any of clauses 10-11, wherein the processor, when executing the control application, is further configured to calculate an average network bandwidth utilization of a cluster of content servers to which the first content server belongs, wherein modifying the first number of entries based on the result comprises increasing or decreasing the first number of entries included in the plurality of entries based on a ratio of the average network bandwidth utilization of the cluster of content servers to the network bandwidth utilization of the first content server.

13. The control server of any of clauses 10-12, wherein: modifying the first number of entries comprises adding at least one additional entry to the first number of entries, and reallocating the at least one file included in the first plurality of files comprises moving the at least one file from a second content server to the first content server based on the at least one additional entry, or modifying the first number of entries comprises removing at least one entry from the first number of entries, and reallocating the at least one file included in the first plurality of files comprises moving the at least one file from the first content server to a third content server based on the removal of the at least one entry.

14. The control server of any of clauses 10-13, wherein generating the hash data structure comprises: sorting the files by popularity to generate a sorted list; dividing the sorted list into two or more segments, wherein a first segment included in the two or more segments includes the first plurality of files, the first plurality of files having a highest degree of popularity relative to other files included in the sorted list; and for each content server included in the plurality of content servers, adding a given number of entries to the hash data structure based on a network bandwidth capacity associated with the content server.

15. The control server of any of clauses 10-14, wherein the processor, when executing the control application, is further configured to generate a second hash data structure by adding, for each content server included in the plurality of content servers, a given number of entries to the second hash data structure based on a remaining storage capacity associated with the content server.

16. The control server of any of clauses 10-15, wherein the processor, when executing the control application, is further configured to allocate a second plurality of files included in a second segment of the two or more segments to the plurality of content servers based on the second hash data structure.

17. The control server of any of clauses 10-16, wherein each file included in the second plurality of files has a degree of popularity that is lower than a degree of popularity of any file included in the first plurality of files.

18. The control server of any of clauses 10-17, wherein the processor, when executing the control application, is further configured to calculate a cutoff point in the sorted list by solving a linear program (LP) based on at least one of a storage capacity of content servers included in the plurality of content servers, a network bandwidth capacity of the content servers included in the plurality of content servers, and an expected network bandwidth utilization associated with each segment included in the two or more segments, wherein the sorted list is divided into two or more segments based on the cutoff point.

19. A non-transitory computer-readable storage medium including instructions that, when executed by a processor, cause the processor to perform the steps of: generating a first hash data structure having a plurality of entries that correspond to a plurality of content servers, wherein a first number of entries included in the plurality of entries corresponds to a first content server included in the plurality of content servers; for each file included in a first plurality of files, allocating the file to one or more content servers included in the plurality of content servers by comparing a hash value associated with the file to one or more entries included in the plurality of entries; comparing a network bandwidth utilization of the first content server to a network bandwidth utilization associated with one or more other content servers included in the plurality of content servers to generate a result; modifying the first number of entries included in the plurality of entries based on the result to generate a biased hash data structure; reallocating at least one file included in the first plurality of files to a different content server included in the plurality of content servers based on the biased hash data structure; and generating a second hash data structure by adding, for each content server included in the plurality of content servers, a given number of entries to the second hash data structure based on a remaining storage capacity associated with the content server.

20. The non-transitory computer-readable storage medium of clause 19, further comprising instructions that, when executed by the processor, cause the processor to calculate an average network bandwidth utilization of a cluster of content servers to which the first content server belongs, wherein modifying the first number of entries based on the result comprises increasing or decreasing the first number of entries included in the plurality of entries based on a ratio of the average network bandwidth utilization of the cluster of content servers to the network bandwidth utilization of the first content server.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
    generating, for a first content server included in a plurality of content severs, a first number of entries in a first hash data structure, wherein the first hash data structure has a plurality of entries corresponding to the plurality of content servers;
    allocating a first file included in a first segment of files to the first content server by comparing a hash value associated with the first file to at least one entry included in the first number of entries generated for the first content server;
    determining that none of the content services included in the plurality of content servers is either overutilized or underutilized;
    generating, for the first content server, a second number of entries in a second hash data structure, wherein the second hash data structure has a second plurality of entries corresponding to the plurality of content servers; and
    allocating a second file included in a second segment of files to the first content server by comparing a hash value associated with the second file to at least one entry included in the second number of entries generated for the first content server.

2. The computer-implemented method of claim 1, wherein the first number of entries generated in the first hash data structure for the first content server corresponds to a network bandwidth capacity of the first content server.

3. The computer-implemented method of claim 2, wherein the first number of entries generated in the first hash data structure for the first content server is proportional to the network bandwidth capacity of the first content server.

4. The computer-implemented method of claim 1, wherein the second number of entries generated in the second hash data structure for the first content server corresponds to a remaining storage capacity of the first content server.

5. The computer-implemented method of claim 4, wherein the second number of entries generated in the second hash data structure for the second content server is proportional to the remaining storage capacity of the first content server.

6. The computer-implemented method of claim 1, further comprising generating a bit map based on the first hash data structure and the second hash data structure that indicates that the first file and the second file are stored on the first content server.

7. The computer-implemented method of claim 1, further comprising scaling a number of entries generated in the first hash data structure for the first content server from the first number of entries to a different number of entries prior to generating the second number of entries in the second hash data structure for the first content server.

8. The computer-implemented method of claim 1, further comprising:
    sorting a plurality of files by popularity to generate a sorted list of files; and
    dividing the sorted list into the first segment of files and the second segment of files based on, for each file included in the sorted list of files, a degree of popularity associated the file.

9. The computer-implemented method of claim 8, wherein each file included in the second segment of files has a degree of popularity that is lower than a degree of popularity of any file included in the first segment of files.

10. The computer-implemented method of claim 1, further comprising:
    calculating a cutoff point in a sorted list of files; and
    determining the first segment of files and the second segment of files based on the cutoff point.

11. The computer-implemented method of claim 10, wherein the first segment of files is allocated across the plurality of content servers using the first hash data structure, and the second segment of files is allocated across the plurality of content servers using the second hash data structure.

12. The computer-implemented method of claim 10, wherein the cutoff point is calculated by solving a linear program having at least one constraint that includes at least one of a number of content servers included in the plurality of content servers, a storage capacity and a network bandwidth capacity of each content server included in the plurality of content servers, or expected ratios of traffic to be served from files included the first segment of files and filed included in the second segment of files.

13. One or more non-transitory computer-readable media storing instructions that, when executed by one or more processors, cause the one or more processors to perform the steps of:
    generating, for a first content server included in a plurality of content severs, a first number of entries in a first hash data structure, wherein the first hash data structure has a plurality of entries corresponding to the plurality of content servers;
    allocating a first file included in a first segment of files to the first content server by comparing a hash value associated with the first file to at least one entry included in the first number of entries generated for the first content server;
    generating, for the first content server, a second number of entries in a second hash data structure, wherein the second hash data structure has a second plurality of entries corresponding to the plurality of content servers; and
    allocating a second file included in a second segment of files to the first content server by comparing a hash value associated with the second file to at least one entry included in the second number of entries generated for the first content server.

14. The one or more non-transitory computer-readable media of claim 13, wherein the first number of entries generated in the first hash data structure for the first content server corresponds to a network bandwidth capacity of the first content server.

15. The one or more non-transitory computer-readable media of claim 14, wherein the first number of entries generated in the first hash data structure for the first content server is proportional to the network bandwidth capacity of the first content server.

16. The one or more non-transitory computer-readable media of claim 13, wherein the second number of entries generated in the second hash data structure for the first content server corresponds to a remaining storage capacity of the first content server.

17. The one or more non-transitory computer-readable media of claim 16, wherein the second number of entries generated in the second hash data structure for the second content server is proportional to the remaining storage capacity of the first content server.

18. The one or more non-transitory computer-readable media of claim 13, further comprising generating a bit map based on the first hash data structure and the second hash data structure that indicates that the first file and the second file are stored on the first content server.

19. The one or more non-transitory computer-readable media of claim 13, further comprising scaling a number of entries generated in the first hash data structure for the first content server from the first number of entries to a different number of entries prior to generating the second number of entries in the second hash data structure for the first content server.

20. The one or more non-transitory computer-readable media of claim 13, further comprising:
    sorting a plurality of files by popularity to generate a sorted list of files; and
    dividing the sorted list into the first segment of files and the second segment of files based on, for each file included in the sorted list of files, a degree of popularity associated the file.

21. The one or more non-transitory computer-readable media of claim 20, wherein each file included in the second segment of files has a degree of popularity that is lower than a degree of popularity of any file included in the first segment of files.

22. The one or more non-transitory computer-readable media of claim 13, further comprising;
    calculating a cutoff point in a sorted list of files; and
    determining the first segment of files and the second segment of files based on the cutoff point.

23. The one or more non-transitory computer-readable media of claim 22, wherein the first segment of files is allocated across the plurality of content servers using the first hash data structure, and the second segment of files is allocated across the plurality of content servers using the second hash data structure.

24. The one or more non-transitory computer-readable media of claim 22, wherein the cutoff point is calculated by solving a linear program having at least one constraint that includes at least one of a number of content servers included in the plurality of content servers, a storage capacity and a network bandwidth capacity of each content server included in the plurality of content servers, or expected ratios of traffic to be served from files included the first segment of files and filed included in the second segment of files.

25. A system, comprising:
    one or more memories storing instructions; and
    one or more processors that are coupled to the one or more memories and, when executing the instructions, are configured to:
    generate, for a first content server included in a plurality of content severs, a first number of entries in a first hash data structure, wherein the first hash data structure has a plurality of entries corresponding to the plurality of content servers;
    allocate a first file included in a first segment of files to the first content server based on a hash value associated with the first file and the first hash data structure;
    generate, for the first content server, a second number of entries in a second hash data structure, wherein the second hash data structure has a second plurality of entries corresponding to the plurality of content servers; and allocate a second file included in a second segment of files to the first content server based on a hash value associated with the second file and the second hash data structure.

26. The system of claim 25, wherein the first number of entries generated in the first hash data structure for the first content server corresponds to a network bandwidth capacity of the first content server.

27. The system of claim 26, wherein the first number of entries generated in the first hash data structure for the first content server is proportional to the network bandwidth capacity of the first content server.

28. The system of claim 25, wherein the second number of entries generated in the second hash data structure for the first content server corresponds to a remaining storage capacity of the first content server.

29. The system of claim 28, wherein the second number of entries generated in the second hash data structure for the second content server is proportional to the remaining storage capacity of the first content server.

30. The system of claim 25, wherein the one or more processors are further configured to generate a bit map based on the first hash data structure and the second hash data structure that indicates that the first file and the second file are stored on the first content server.

31. The system of claim 25, wherein the one or more processors are further configured to scale a number of entries generated in the first hash data structure for the first content server from the first number of entries to a different number of entries prior to generating the second number of entries in the second hash data structure for the first content server.

32. The system of claim 26, wherein the one or more processors are further configured to:
sort a plurality of files by popularity to generate a sorted list of files; and
divide the sorted list into the first segment of files and the second segment of files based on, for each file included in the sorted list of files, a degree of popularity associated the file.

33. The system of claim 32, wherein each file included in the second segment of files has a degree of popularity that is lower than a degree of popularity of any file included in the first segment of files.

34. The system of claim 25, wherein the one or more processors are further configured to:
calculate a cutoff point in a sorted list of files; and
determine the first segment of files and the second segment of files based on the cutoff point.

35. The system of claim 34, wherein one or more processors allocate the first segment of files across the plurality of content servers using the first hash data structure and allocate the second segment of files across the plurality of content servers using the second hash data structure.

36. The system of claim 34, wherein the one or more processors calculate the cutoff point by solving a linear program having at least one constraint that includes at least one of a number of content servers included in the plurality of content servers, a storage capacity and a network bandwidth capacity of each content server included in the plurality of content servers, or expected ratios of traffic to be served from files included the first segment of files and filed included in the second segment of files.

* * * * *